Patented June 23, 1925.

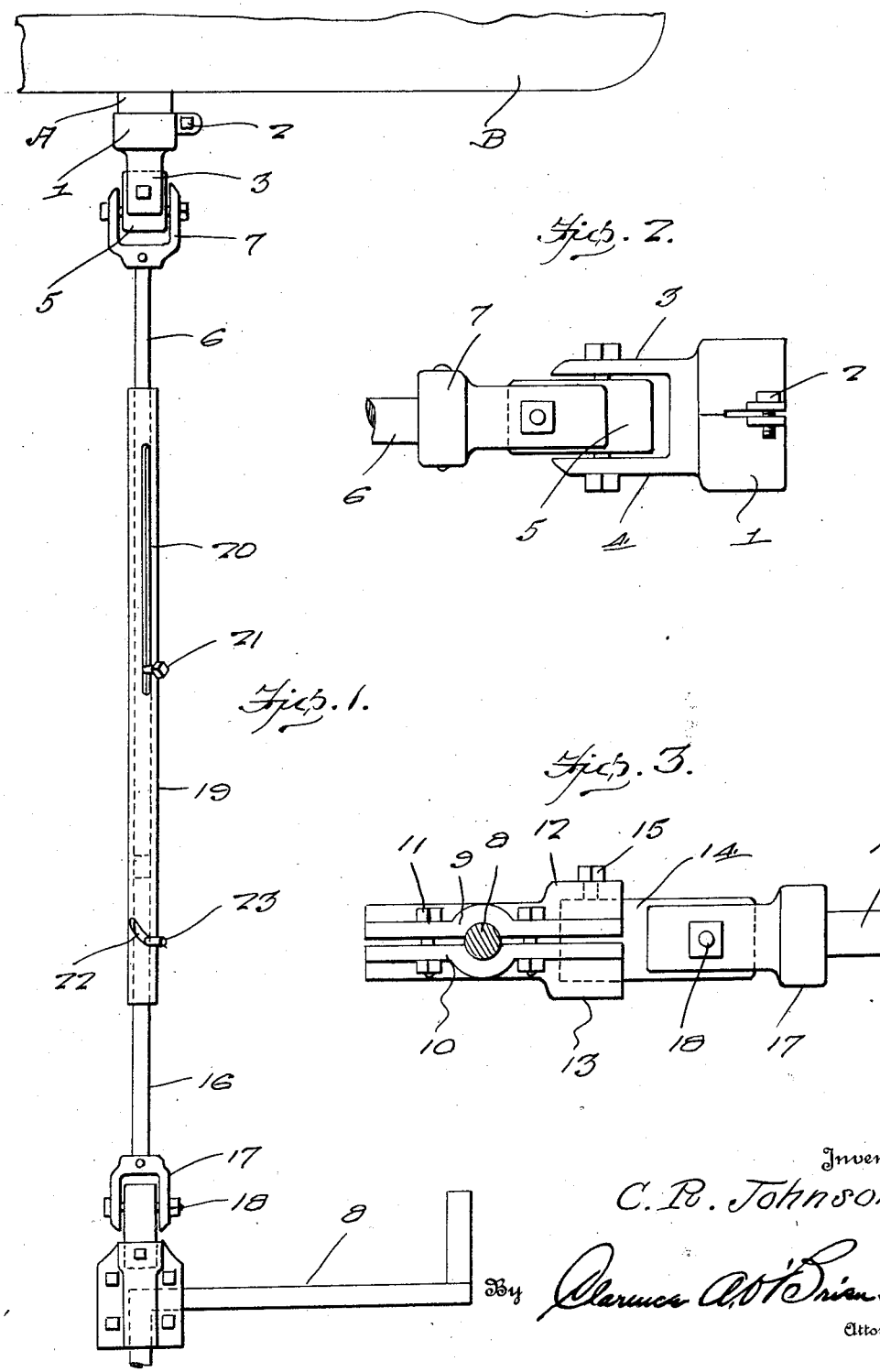

1,542,889

UNITED STATES PATENT OFFICE.

CARROLL R. JOHNSON, OF ESSEX, IOWA.

MOTOR-STARTING DEVICE.

Application filed June 12, 1924. Serial No. 719,633.

*To all whom it may concern:*

Be it known that I, CARROLL R. JOHNSON, a citizen of the United States, residing at Essex, in the county of Page and State of Iowa, have invented certain new and useful Improvements in a Motor-Starting Device, of which the following is a specification.

This invention relates to new and useful improvements in starting devices for motors and has for its principal object to provide a simple and efficient device whereby the motor power of one vehicle is employed for starting the motor of another vehicle such as a Fordson tractor or the like.

A further object of the invention is to provide a motor starting device of the above mentioned character, which may be readily and easily secured in an operative position and will be positive and efficient in its operation.

A still further object of the invention is to provide a motor starting device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a top plan view of my improved motor starting device showing the same in an operative position.

Figure 2 is a side elevation of the socket member, and

Figure 3 is a side elevation of the crank engaging member.

In the drawing wherein for the purpose of illustration is shown the preferred embodiment of my invention, the numeral 1 designates a socket member which is split and adapted to be removably secured on the hub A of a vehicle drive wheel B. A fastening bolt 2 is associated with the split portion of the socket member for tightening the socket member in position on the hub of the drive wheel. Extending from the socket member 1 are the spaced ears 3 and 4 respectively and the same provide a means therebetween the universal joint 5 which may be of any conventional construction.

The universal joint affords connection between the socket member 1 and the elongated rod or arm 6 through the medium of the U-shaped head 7 secured to one end of the rod in the manner clearly illustrated in Figures 1 and 2 of the drawing.

The crank of a motor vehicle such as a Fordson tractor or the like which is to be operated for starting the motor is designated generally by the numeral 8 and adapted to be clamped in engagement with the crank 8 at the bend thereof are the complementary plates 9 and 10 respectively, the same being of such a construction as to fit over the bend in the crank 8 and are secured together by means of the fastening bolts 11. The complementary plates 9 and 10 are provided at one end with the outwardly extending portions 12 and 13 respectively, wherein a socket is formed for receiving and supporting therein the head 14. The same is secured in the socket by means of the set screw 15 in the manner more clearly illustrated in Figure 3 of the drawing.

The head 14 affords connection to one end of an elongated rod or arm 16 through the medium of the U-shaped member 17 and the pivotal connection 18.

Connecting the rods 6 and 16 together whereby the same are adapted for rotary movement simultaneously, is the elongated sleeve or tubular member 19. The same is adapted to receive the inner opposed end of the rod and for the purpose of adjustably securing the rod 6 therein, I provide the sleeve with an elongated slot 20 through which extends the set screw 21, the latter being supported by the rod 6 and by tightening the set screw 21, the rod 6 is held in an adjusted position with respect to the sleeve 19 and will further rotate therewith. The opposite end of the sleeve is provided with a spiral slot 22, and the purpose thereof is to provide a means for facilitating the axial movement of the rod 16 through the medium of the pin 23 which extends through the spiral slot 22 in the manner clearly illustrated in Figure 1.

Oftentimes great difficulty is experienced in endeavoring to start the engine of a tractor or other motor vehicle where the same is not provided with a self starter and one must necessarily use the hand crank for starting the engine. In order that the engine or motor may be started without necessitating manual labor, a device of the character above described is employed in connection with the rear drive wheel of a motor vehicle. The motor vehicle which is to be used in starting the motor of the tractor in position so that one of the rear drive wheels thereof is disposed at substantially right angles to the crank 8 of the tractor and is spaced a suitable distance therefrom. The drive wheel adjacent the crank is then raised off of the ground through the medium of a jack or the like so that when the motor vehicle is operated, the drive wheel will be rotated without causing the forward movement of the vehicle. It is of course understood that the socket member 1 is first secured on the hub cap A of the drive wheel B and the clamping plates 9 and 10 respectively are secured to the crank 8. When the parts are arranged as shown in Figure 1 of the drawing, the drive wheel is rotated and similar motion will be transmitted to the rods 6 and 16 and to the crank 8 and the clutch on the crank (not shown) will engage the pin on the crank shaft of the tractor (not shown) when the pin 23 on the rod 16 is in the position in the spiral slot 22 as shown in the drawing whereby the crank 8 will be operated for starting the engine of the tractor. As soon as the tractor engine operates, it will automatically release the clutch on the crank 8 from engagement with the starter pin on the crank shaft and the axle movement of the rod 16 will cause the pin 23 to travel in the spiral slot 22 so as to prevent any possibility of the teeth on the clutch on the crank from being stripped.

It will thus be seen from the foregoing description, that an engine starter has been provided wherein the same may be readily and easily assembled and will save considerable time and labor in cranking an engine. The simplicity of my device enables the same to be manufactured at a very low cost and will further be strong and durable and at all times positive in its operation.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. An engine starter comprising a member adapted to be secured to a drive wheel, an additional member adapted to be secured to the crank of an engine to be started, a connection between said members as to cause one to be rotated by the other, and means in the connection for causing a longitudinal movement of one member away from the other member upon rotation of one member by the other through the connection.

2. An engine starter comprising a member adapted to be secured to a drive wheel, an additional member adapted to be secured to the crank of an engine to be started, and means between the two members whereby one may be rotated by the other and moved therefrom upon rotation for moving the crank into an operative position.

3. An engine starter comprising a member adapted to be secured to a drive wheel, an additional member adapted to be secured to the crank of an engine to be started, a connecting bar attached to the members and including a pair of telescopically associated sections, one of said sections provided with an arcuate slot, and a pin extending from the other section through the slot whereby upon rotation of the first member, said second member will be rotated therewith and moved a distance therefrom for causing the crank to move in an operative position.

4. An engine starter comprising a member adapted to be secured to a drive wheel, an additional member adapted to be secured to the crank of an engine to be started, a connecting rod between the members including three sections, one attached to the first member, one attached to the second member, and the other tubular in construction for receiving the other sections, said tubular section provided with a longitudinally extending slot at one end and an arcuate slot at the other end, a set screw on one section extended through the longitudinal slot and a pin on one section extending through the arcuate slot whereby the length of the rod may be adjusted and also whereby upon rotation of the first member the second member will be moved longitudinally therefrom to cause the crank to move into an operative position.

In testimony whereof I affix my signature.

CARROLL R. JOHNSON.